United States Patent [19]
Endo

[11] Patent Number: 5,522,074
[45] Date of Patent: May 28, 1996

[54] VECTORIZATION SYSTEM FOR VECTORIZING LOOP CONTAINING CONDITION INDUCTION VARIABLES

[75] Inventor: Akiyoshi Endo, Tokyo, Japan

[73] Assignee: NEC Corporation, Tokyo, Japan

[21] Appl. No.: 165,941

[22] Filed: Dec. 14, 1993

[30] Foreign Application Priority Data

Dec. 14, 1992 [JP] Japan .................... 4-353614

[51] Int. Cl.$^6$ .................... G06F 9/45; G06F 5/00
[52] U.S. Cl. .................... 395/700; 395/375; 395/500;
364/232.21; 364/259; 364/262; 364/DIG. 1;
364/DIG. 11
[58] Field of Search .................... 395/700, 375,
395/800; 364/200, 300, 700

[56] References Cited

U.S. PATENT DOCUMENTS

| | | | |
|---|---|---|---|
| 4,773,007 | 9/1988 | Kanada et al. | 364/300 |
| 4,807,126 | 2/1989 | Gotou et al. | 364/300 |
| 4,821,181 | 4/1989 | Iwasawa et al. | 364/200 |
| 5,109,331 | 4/1992 | Ishida et al. | 395/375 |
| 5,247,696 | 9/1993 | Booth et al. | 395/800 |
| 5,349,665 | 9/1994 | Endo | 395/700 |

OTHER PUBLICATIONS

Wolfe "Software Optimization for Supercomputers", Supercomputers Class VI Systems, Hardware and Software, pp. 221–238, (1986).

*Primary Examiner*—Kevin A. Kriess
*Assistant Examiner*—Majid A. Banankhah
*Attorney, Agent, or Firm*—Foley & Lardner

[57] ABSTRACT

A vectorization system is constituted with a conditional induction variable detector portion, a conditional induction variable reference state analyzing portion and a conditional induction variable iteration generator portion. The conditional induction variable detector portion detects conditional variable for loop parts detected by syntax analysis. When the conditional induction variable is detected, the conditional induction variable reference state analyzing portion attempts to detect global reference of conditional induction variable by analyzing the reference state of the conditional induction variables and, when the global reference of conditional induction variable is detected, the conditional induction variable iteration generator portion generates, in an output program, an iteration for representing the conditional induction variable as a work array.

6 Claims, 9 Drawing Sheets

FIG. 3

```
      J=0
      DO 10 I=1,N
        IF(T1(I).GT.0)THEN
        J=J+1
        B(I)=A(J)
        END IF
        J=J+1
        IF(T2(I).GT.0)THEN
         C(I)=A(J)
         J=J+2
         D(J)=A(J)
        END IF
        E(J)=E(J)+1
   10 CONTINUE
```

FIG. 4

```
      j=0
      do 10 i=1,n
        if(t1(i).gt.0)then
         j=j+1
         b(i)=a(j)
        end if
        j=j+1
        if(t2(i).gt.0)then
          c(i)=a(j)
          j=j+2
          d(j)=a(j)
        end if
        e(j)=e(j)+1
   10 continue
```

FIG. 5

```
jj(1)=0
j=jj(1)
do 10 i=1,n
  p(i)=0
  p(i)=p(i)+1
  if(t1(i).gt.0)p(i)=p(i)+1
  if(t2(i).gt.0)p(i)=p(i)+2
  jj(i+1)=jj(i)+p(i)
  j=jj(i)
  if(t1(i).gt.0)then
    j=j+1
    b(i)=a(j)
  end if
  j=j+1
  if(t2(i).gt.0)then
    c(i)=a(j)
    j=j+2
    d(j)=a(j)
  end if
  e(j)=e(j)+1
10 continue
```

FIG. 6

```
jj(1)=0
[mask1(i)=(t1(i).gt.0),i=1,n]
[mask2(i)=(t2(i).gt.0),i=1,n]
[p(i)=0,i=1,n]
[p(i)=p(i)+1,i=1,n]
[p(i)=p(i)+1 on mask1(i),i=1,n]
[p(i)=p(i)+2 on mask2(i),i=1,n]
[jj(i+1)=jj(i)+p(i),i=1,n]
[jw(i)=jj(i),i=1,n]

[jw(i)=jw(i)+1 on mask1(i),i=1,n]
[b(i)=a(jw(i)) on mask1(i),i=1,n]

[jw(i)=jw(i)+1,i=1,n]

[c(i)=a(jw(i)) on mask2(i),i=1,n]
[jw(i)=jw(i)+2 on mask2(i),i=1,n]
[d(jw(i))=a(jw(i)) on mask2(i),i=1,n]

```
      JJ(1) = 0
      J = JJ(1)
      DO 10 I = 1, N
        P(I) = 0
        P(I) = P(I) + 1
        IF (T1(I).GT.0) P(I) = P(I) + 1
        IF (T2(I).GT.0) P(I) = P(I) + 2
        JJ(I+1) = JJ(I) + P(I)
        J = JJ(1)
        IF (T1(I).GT.0) THEN
          J = J + 1
          B(I) = A(J)
        END IF
        J = J + 1
        IF (T2(I).GT.0) THEN
          C(I) = A(J)
          J = J + 2
          D(J) = A(J)
        END IF
        E(J) = E(J) + 1
   10 CONTINUE
```

VECTORIZATION SYSTEM FOR VECTORIZING LOOP CONTAINING CONDITION INDUCTION VARIABLES

BACKGROUND OF THE INVENTION

1. Field of the Invention

The present invention relates to a vectorization system to be used in a language processing system such as compiler or pre-processor, etc., for a computer having vector processing function and, particularly, to a vectorization system for performing a vectorization for a computer to make an efficient use of vector processing function thereof.

The term "vectorization" is to receive a source program to which no vector processing is considered or any intermediate expression equivalent thereto inputted as an input program and to output an object program containing a vector processing instruction, the source program modified such that a vector processing instruction can be easily produced or an intermediate expression containing the vector processing instruction, etc., as an output program.

In a computer having the above-mentioned vector processing function, execution of vector processing is performed at very high speed compared with that of a scaler processing. Therefore, in order to enhance the performance of a computer, that is, the so-called Vector Processor, which can execute vector processing, it is very important to increase a ratio of a portion of an object program which is executed by vector processing, that is, vectorization rate. In view of this, it has been desired to vectorize the object program in the above-mentioned compiler processing for the vector processor to as high rate as possible.

Further, a pre-processor for the above-mentioned computer functions, in order to make a compiler possible to achieve a higher vectorization rate within its vectorization capability, to modify a format of the source program which is described with a high level language such as FORTRAN, etc., to one which is easily vectorized by a compiler, that is, a format capable of being recognized as to be vectorizable. Such vectorization in the pre-processor is also important to improve vectorization rate of the object program.

Further, even in language processing systems other than those of the compiler and the pre-processor, vectorization of an input program shall contribute to improvement of vectorization rate of the object program.

2. Prior Art Description

Objects to be subjected to such vectorization processing are loop parts of an input program or an intermediate expression corresponding to the input program, that is, a collection of statements forming the loop or their intermediate expressions. By recognizing respective array subscripting patterns in these loop parts, the data dependence among the respective arrays can be analysed. In this analysis, when variables to be used as subscripters of the arrays are defined by assignment statement in a format "variable= variable+ increment value" (where variable in the left side term is identical to variable in the right side term), the variable is specifically referred to as "induction variable".

An example of prior art vectorization systems of this type is disclosed in M. Wolfe: "Software Optimization for super-computers", in "SUPERCOMPUTERS Class VI Systems, Hardware and Software", pp. 221–238 (Edited by Sidney FERNBACH, ELSEVIER SCIENCE PUBLISHERS B. V.). In this article, as an optimizing method for making a computer able to have vector processing function, "Induction Variables Recognition" is disclosed (cf. page 224, FIG. 4). The "Induction Variables Recognition" means to exclude from a loop those of induction variables other than the last assignment.

Although this prior art can be adapted independently to a certain conditional structure in the loop, that is, a conditional structure of IF block, etc., which follows IF statement, it can not be adapted when induction variable defined by a conditional structure, that is, conditional induction variable, is referenced over the conditional structure. The fact that conditional induction variable is referenced over conditional structure will be referred to "global reference of conditional induction variable".

An object of the present invention is to provide a vectorization system having a loop containing conditional induction variable with global reference as an object to be vectorized.

Incidentally, although the increment value in the above-mentioned assignment statement is usually a constant, the present invention is also applicable to a case where the increment value is not a constant. Therefore, unless otherwise specified, the increment value shall not be limited to a constant.

SUMMARY OF THE INVENTION

In a preferred embodiment of the present invention, the vectorization system according to the present invention functions to translate an input program of a language processing system for a computer having vector processing function such that the vector processing function thereof can be effectively utilized. The vectorization system includes a conditional induction variable detector portion, an induction variable reference state analysis portion and an induction variable iteration generator portion. The conditional induction variable detector portion detects presence of conditional induction variables defined in the conditional structure in loop parts of the input program. When the conditional induction variable detector portion detects a conditional induction variable, the induction variable reference state analysis portion determines whether the conditional induction variable is referenced externally of the conditional structure in which the conditional induction variable is defined. When the induction variable reference state analysis portion determines that the conditional induction variable is referenced externally of the conditional structure, the induction variable iteration generator portion generates an iteration which expresses the conditional induction variable as a temporary array data structure which is vectorizable.

BRIEF DESCRIPTION OF THE DRAWINGS

The above-mentioned and other objects, features and advantages of the present invention will become more apparent by reference to the following detailed description of the present invention taken in conjunction with the accompanying drawings wherein:

FIG. 3 shows an example of a source program;

FIG. 4 shows an example of an intermediate text produced by a syntactic analysis portion;

FIG. 5 shows an example of an intermediate text produced by the vectorization system;

FIG. 6 shows an example of an intermediate text produced and vectorized by the vectorization system;

FIG. 9 shows an example of a source program which is outputted by a pre-processor of the second embodiment and is adapted to vectorization;

DETAILED DESCRIPTION OF THE PREFERRED EMBODIMENTS

An embodiment of the present invention will be described with reference to the accompanying drawings.

Figure 1:
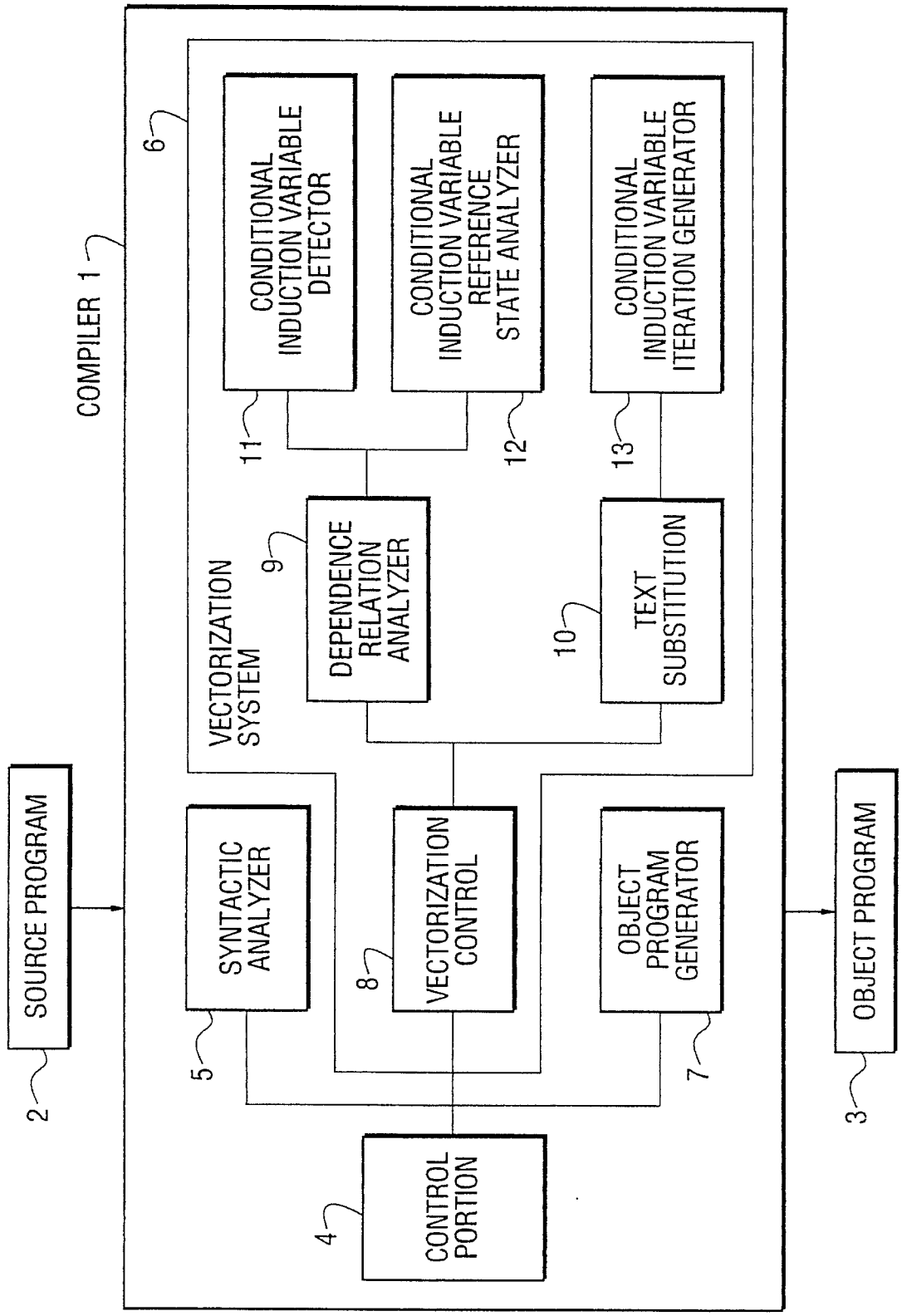
FIG. 1 is a block diagram of a vectorization system, which is useful to explain a first embodiment of the present invention.

Referring to FIG. 1, a vectorization system 6 according to a first embodiment of the present invention is realized on a compiler 1 which receives a source program 2 which is described with high level language and not vectorized and outputs an object program 3 which is vectorized.

The compiler 1 is constituted with a control portion 4, a syntactic analysis portion 5, the vectorization system 6 of the present invention and an object program generator portion 7.

The vectorization system 6 is constituted with a vectorization control portion 8, a dependence relation analysis portion 9, a text substitution portion 10, a conditional induction variable detector portion 11, a conditional induction variable reference state analysis portion 12 and a conditional induction variable iteration generator portion 13.

An operation of the vectorization system 6 constituted as mentioned above will be described.

In FIG. 1, the control portion 4 of the compiler 1 controls an operation of the compiler 1 as a whole. The control portion 4 controls the compiler 1 such that, for example, the syntactic analysis portion 5, the vectorization system 6 and tile object program generator portion 7 are sequentially activated.

The syntactic analysis portion 5 of the compiler 1 analyzes a syntax of the source program 2, generates an intermediate text corresponding to the source program 2 and supplies it to the vectorization system 6.

The control of respective portions of the compiler to be performed by the control portion 4 and the syntactic analysis to be performed by the syntactic analyser portion 5 are well known.

The vectorization system 6 sequentially detects loop parts existing in the intermediate text generated by the syntactic analyser portion 5 and attempts to vectorize the detected loop parts, that is, to substitute vector instructions for statements in the loop parts.

In detail, the vectorization control portion 8 of the vectorization system 5 attempts to detect the loop parts in the intermediate text generated by the syntactic analyser portion 5 and, when any loop part is detected, activates the dependence relation analyser portion 9 and the text substitution portion 10 sequentially in order to vectorize the loop part.

The dependence relation analyser portion 9 activated by the vectorization control-portion 8 analyzes positional relations of definitions and quotations and subscriptions of variables of the respective statements including array variables. During this process, the dependence relation analyser portion 9 activates the conditional variable detector portion 11 and further the conditional induction variable reference state analyser portion 12, if necessary, to perform processings including detection of conditional induction variables in the conditional structure and detection of global reference of conditional induction variables, etc.

The text substitution portion 10 substitutes statements expressing vector instructions for statements in the intermediate text which is generated by the syntactic analyser portion 5 and considered as vectorizable, on the basis of a result of an analysis performed by the dependence relation analyser portion 9. During this processing, the text substitution portion 10 activates the conditional induction variable iteration generator portion 13 on demand to produce conditional induction variable iteration, etc.

As described, the vectorization system 6 produces the vectorized intermediate text and supplies the latter to the object program generator portion 7. It should be noted in this regard that, depending upon a content of the source program 2, there may be a case where the intermediate text does not contain loop parts which can be vectorized. In this vectorizing process, it becomes also possible to vectorize loop parts in which a conditional induction variable with global reference exists.

The object program generator portion 7 generates a vectorized object program 3 corresponding to the source program 2, on the basis of the vectorized intermediate text generated by the vectorization system 6. That is, the compiler 1 outputs the vectorized object program 3.

An operation of the first embodiment of the present invention thus described will be described in detail with reference to FIGS. 2 through 6, as to the generation of the vectorized intermediate text containing a group of statements shown in FIG. 6 from the source program 2 containing a set of statements shown in FIG. 3.

Figure 2:
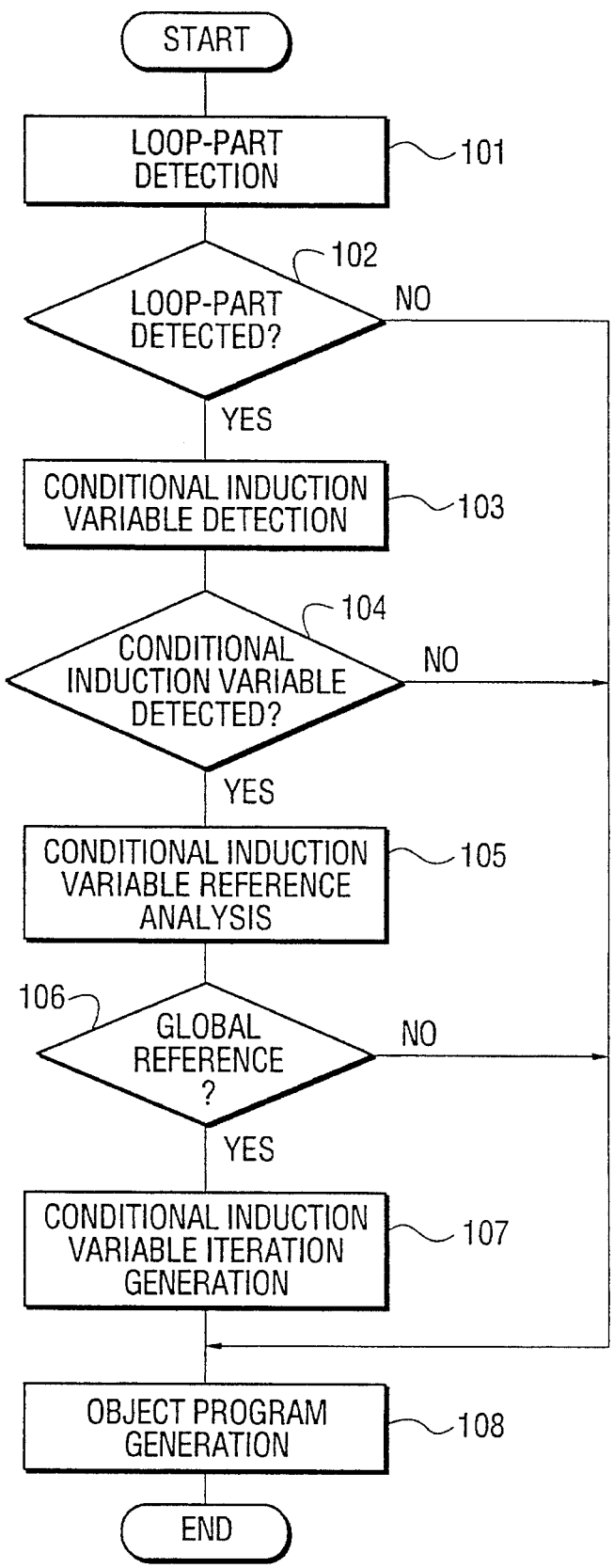
FIG. 2 is a flowchart showing an operation of the vectorization system according to the first embodiment.

Referring to FIG. 2, the operation of the first embodiment includes an operation of the vectorization system 6 (steps 101 to 107) and an operation of the object program generator portion 7 (step 108).

The syntactic analyser portion 5 of the compiler 1 generates the intermediate text from the source program 2. The source program 2 contains the group of statements shown in FIG. 3 and are described in FORTRAN. The intermediate text containing a set of statements is shown in FIG. 4.

The vectorization control portion 8 of the vectorization system 6 detects loop parts from the intermediate text (step 101). Then, when vectorization control portion 8 detects the set of statements shown in FIG. 4 as the loop parts (step 102), it activates the dependence relation analyser portion 9 and the text substitution portion 11 in sequence to vectorize the loop parts.

The dependence relation analyser portion 9 analyzes positional relations of definitions and quotations and subscriptions of variables of the respective statements including array variables. During this process, the dependence relation analyser portion 9 activates the conditional induction variable detector portion 11.

The conditional induction variable detector portion 11 detects that a variable j in FIG. 4 (in FIG. 3, this corresponds to a variable j) is a conditional induction variable (step 103). This detection is realized by recognizing the facts that there are definitions in the form of "j=j+ increment value" (statements in the forms of "j=j+1" and "j=j+2") and that some of these definitions exist within IF blocks (conditional structures).

In the case of the processing of the examples shown in FIGS. 3 through 6 in which the conditional induction variable detector portion 11 detects one or more conditional induction variables within the conditional structures (step 104), the dependence relation analyser portion 9 activates the conditional induction variable reference state analyser portion 12.

The conditional induction variable reference state analyser portion 12 analyzes the state of reference of the conditional induction variable j in the loop parts (step 105). From the analysis, the conditional induction variable reference state analyser portion 12 detects the fact that the conditional induction variable j is referenced externally of the IF block to which the definition of conditional induction variable j belongs, that is, it detects the global reference of conditional induction variable. For the conditional induction variable j in FIG. 4, since the definitions in the form of "j=j+ increment value" exist at three locations belonging to different basic blocks, it is preliminarily known in the conditional induction variable detector portion 11 that the global reference of conditional induction variable exists. However, in such case as where, in FIG. 4, two statements in the form of "j=j+1" do not exist, the global reference of conditional induction variable is detected first by the conditional induction variable reference state analyser portion 12. Therefore, the above-mentioned processing to be performed by the conditional induction variable reference state analyser portion 12 is indispensable.

The text substitution portion 10 substitutes statements expressing vector instructions for statements in the intermediate text containing the group of statements shown in FIG. 4 which are considered as vectorizable, on the basis of the result of an analysis performed by the dependence relation analyser portion 9. During this processing, in a case where there is conditional induction variable with global reference in the loop parts shown in FIG. 4, that is, in a processing of the examples shown in FIGS. 2 through 5 (step 106), the text substitution portion 10 activates the conditional induction variable iteration generator portion 13 to produce conditional induction variable iteration.

The conditional induction variable iteration generator portion 13 performs the following steps, in order to make the value of the conditional induction variable j possible to be calculated by a vector instruction (see FIG. 5):

(1) introducing work array jj(i), (2) introducing increment value array p(i) (referred to as condition reflecting increment value array, hereinafter) having value reflecting presence/absence of conditions (condition "t1(i) gt 0" and condition "t2(i) gt 0") in a conditional structure in which conditional induction variable j exists, and (3) generating an assignment statement having the format of iteration for expressing conditional induction variable j with work array jj(i) by using the work array jj(i) and condition reflecting increment value array p(i). The iteration corresponds, in the example shown in line 8, FIG. 5, to a statement "jj(i+1)=jj(i)+p(i)". The iteration will be referred to as "conditional induction value iteration" hereinafter.

The text substitution portion 10 substitutes the vectorized intermediate text containing the set of statements shown in FIG. 5 for the intermediate text containing the set of statements shown in FIG. 4 such that the conditional induction variable iteration generated by the conditional induction variable iteration generator portion 13 is included therein. The vectorized intermediate text containing the set of statements shown in FIG. 5 can be directly vectorized by using a vector iteration instruction which is one of vector instructions realizing the vectorization function.

In order to make possible the substitution of the intermediate text containing the statement set in FIG. 5 for the intermediate text containing the statement set shown in FIG. 4, it is required that orders of data references in the loop parts shown in FIGS. 4 and 5 do not conflict with each other. An analysis related to this point can be done by means of known analysis technology and, in this embodiment, the dependence relation analyser portion 9 performs this analysis. When a result of an analysis performed by the dependence relation analyser portion 9 is that "the order relation of data reference does not allow such substitution", the above-mentioned vectorization is abandoned and the loop parts in question are executed by scaler operation.

After the text substitution mentioned above completes, the object program generator portion 7 generates the object program from the vectorized intermediate text shown in FIG. 5 (step 108). The object program is used as a set of instructions controlling the computer having the vector processing function.

A second embodiment of the present invention will be described next with reference to FIGS. 7 to 9.

Figure 7:
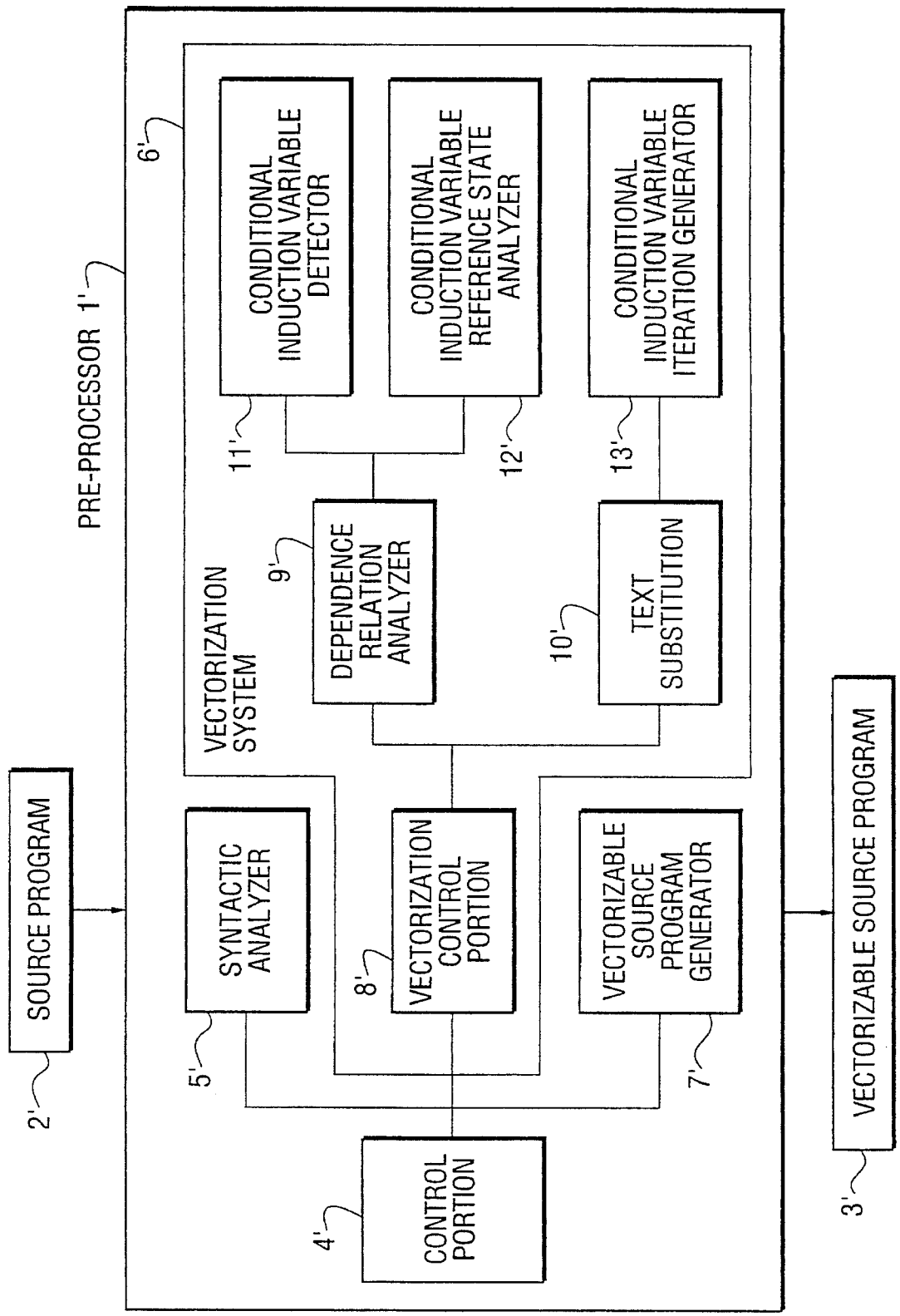
FIG. 7 is a block diagram of a vectorization system, which is useful to explain a second embodiment of the present invention.

In FIG. 7, a vectorization system 6' according to the second embodiment of the present invention is realized on a pre-processor 1' which receives a source program 2' which is described with high level language and whose vectorization is not considered and outputs a source program 3' modified such that it is easily vectorizable.

In the second embodiment, the pre-processor 1' is constituted with a control portion 4', a syntactic analyser portion 5', a vectorization system 6' and a vectorizable source program generator portion 7'.

The vectorization system 6' is constructed with a vectorization control portion 8', a dependence relation analyser portion 9', a text substitution portion 10', a conditional induction variable detector portion 11', a conditional induction variable reference state analyser portion 12' and a conditional induction variable iteration generator portion 13'. This construction of the vectorization system 6' is essentially the same as that of the vectorization system 6 of the first embodiment of the present invention.

Figure 8:
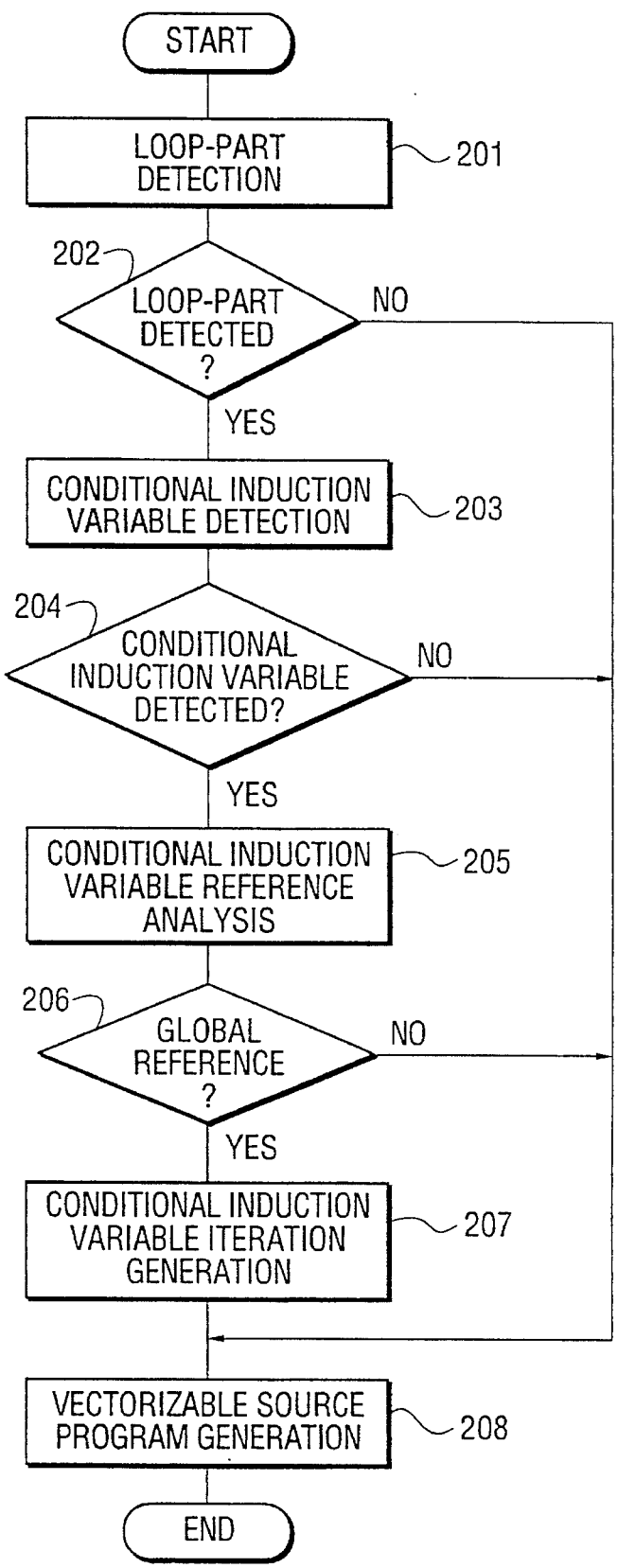
FIG. 8 is a flowchart showing an operation of the vectorization system according to the second embodiment.

A flowchart showing an operation of the vectorization system 6' shown in FIG. 8 is essentially the same as that of the vectorization system 6 of the first embodiment. That is, the conditional induction variable detector portion 11' attempts to detect a conditional induction variable in the source program 2' (cf. FIG. 3) whose syntax is analysed by the syntactic analyser portion 5'. Here, the conditional induction variable J in FIG. 3, etc., is detected. The conditional induction variable reference analyser portion 12' attempts to detect global reference of conditional induction variable related to the conditional induction variable detected by the conditional induction variable detector portion 11'. Here, it detects global reference of conditional induction variable related to the conditional induction variable J in FIG. 3. The conditional induction variable iteration generator portion 13' generates conditional induction variable iteration "JJ(I+1)=JJ(I)+P(I)", etc., for expressing conditional induction variable J with work array JJ(I) by using the work array JJ(I) and condition reflecting increment value array P(I), as shown in Fig. 9. The text substitution portion 10' substitutes the vectorizable source program 3' for the source program 2' such that the conditional induction variable iteration thus generated 13 is included therein.

On the basis of the processing performed by the vectorization system 6', the vectorizable source program generator portion 7' outputs the vectorizable source program 3' containing a set of statements shown in FIG. 9 (step 208). The vectorizable source program 3' is modified compared with the source program 2' such that it is easily vectorized. Therefore, when an object program is to be generated on the basis of the vectorizable source program 3', an improvement of vectorization rate of the object program can be expected compared with the case where the object program is generated on the basis of the source program 2'. That is, the vectorization system 6' contributes indirectly to improvement of vectorization rate of the object program.

Now, a third embodiment of the present invention will be described in detail with reference to FIGS. 10 and 11.

Figure 10:
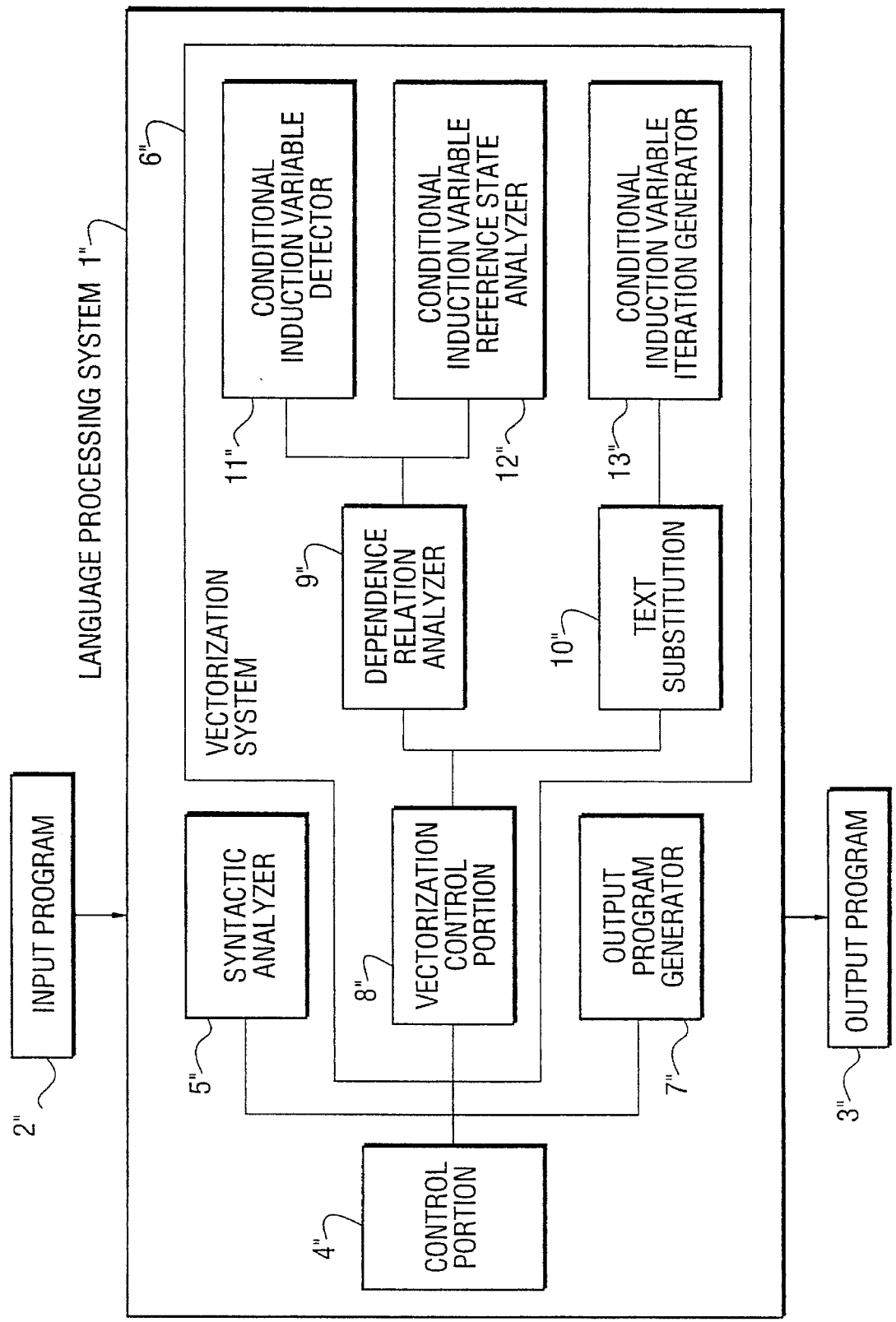
FIG. 10 is a block diagram of a vectorization system, which is useful to explain a third embodiment of the present invention.

Referring to FIG. 10, a vectorization system 6" according to the third embodiment of the present invention is realized on a language processing system 1" which receives an input program 2" which may be a source program whose vectorization is not considered or a program of intermediate expression not vectorized and outputs an output program 3" which is a vectorized object program, a vectorizably modified source program or a program of vectorized intermediate expression.

In the third embodiment, the language processing system 1" is constituted with a control portion 4", a syntactic analyser portion 5", a vectorization system 6" and an output program generator portion 7".

The vectorization system 6" is constituted with a vectorization control portion 8", a dependence relation analyser portion 9", a text substitution portion 10", a conditional induction variable detector portion 11", a conditional induction variable reference state analyser portion 12" and a conditional induction variable iteration generator portion 13". This construction of the vectorization system 6" is essentially the same as that of the vectorization system 6 of the first embodiment.

Figure 11:
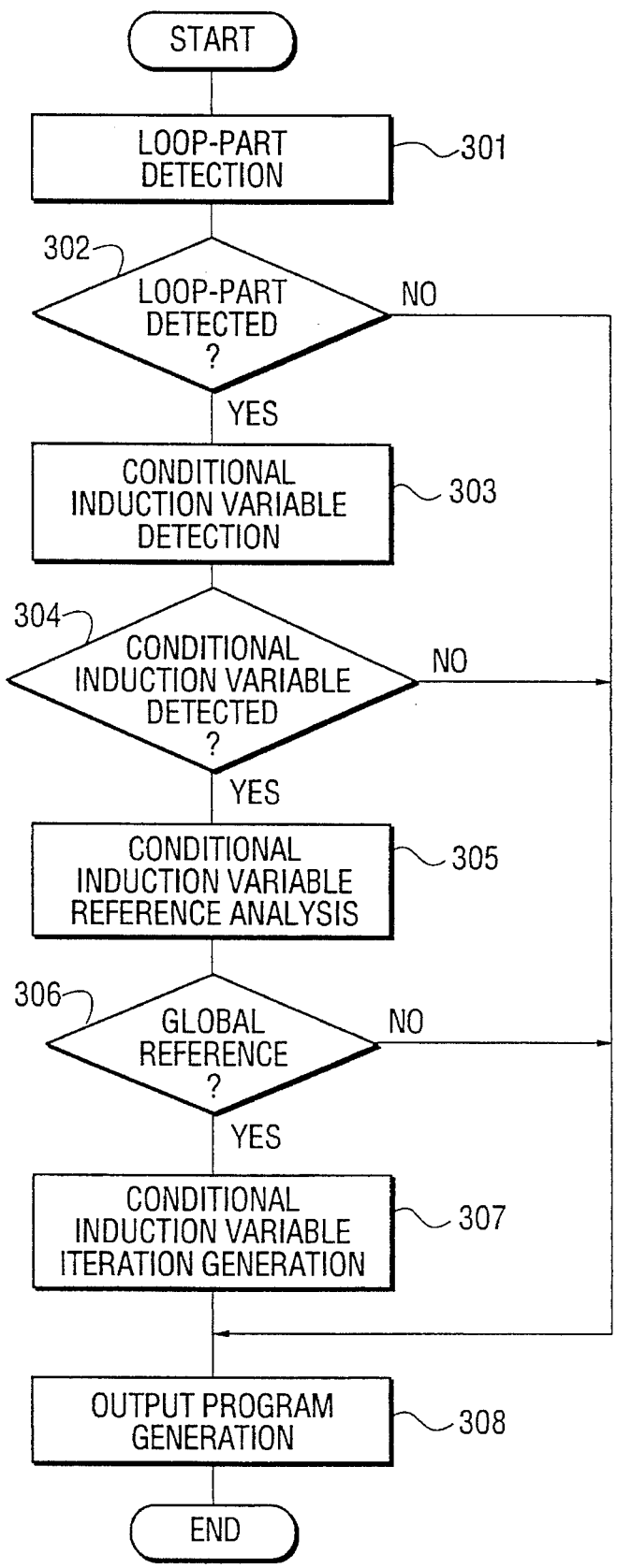
FIG. 11 is a flowchart showing an operation of the vectorization system according to the third embodiment.

Referring to FIG. 11, an operation of the vectorization system 6" is essentially the same as that of the vectorization system 6 of the first embodiment shown in FIG. 2. Further, the third embodiment is based on an upper concept over the first and second embodiments and therefore the preceding embodiments is included in the third embodiment. That is, the conditional induction variable detector portion 11" attempts to detect conditional induction variables in the input program 2" whose syntax is analysed by the syntactic analyser portion 5" or the intermediate expression corresponding to the input program 2". The conditional induction variable reference state analyser portion 12" attempts to detect a global reference of conditional induction variable related to a conditional induction variable detected by the conditional induction variable detector portion 11". The conditional induction variable iteration generator portion 13" generates a conditional induction variable asymptotic equation for expressing conditional induction variable with work array, by using the work array and the condition reflecting increment value array. The text substitution portion 10" transforms the input program 2" or the intermediate expression corresponding to the input program 2" into an output program 3" or an intermediate expression which is a base of the output program 3" such that the input program 2" includes the conditional induction variable iteration thus generated.

On the basis of the processing performed by the above-mentioned vectorization system 6", the output program generator portion 7" outputs the output program 3" (step 308). The vectorization system 6" contributes to the improvement of vectorization rate of the object program directly or indirectly by the generation of the output program 3".

As is clear from the foregoing, according to the present invention, it becomes possible to vectorize the loop parts which include conditional induction variable with global reference which has been not an object to be vectorized in the conventional vectorization system. Therefore, it is possible to improve the vectorization rate of an object program. For example, for a compiler, it is possible to improve vectorization rate directly and, for a preprocessor, it is possible to do so indirectly. Consequently, it is possible to improve the performance of object program, that is, to shorten an execution time, etc.

What is claimed is:

1. A vectorization system in a compiler of a computer having a vectorizing function for performing a vectorization of an input program into an object program having a vector processing instruction in order to make efficient use of the vectorizing function, said vectorization system comprising:

conditional induction variable detecting means, responsive to the input program, for detecting a conditional induction variable defined within a conditional structure containing a set of statements executed conditionally in loop parts of the input program;

conditional induction variable reference state analysis means for determining whether the conditional induction variable is referenced externally of the conditional structure in which the conditional induction variable is defined, when the conditional induction variable defined in the conditional structure is detected by said conditional induction variable detecting means;

conditional induction variable iteration generating means for generating a conditional induction variable iteration representing the conditional induction variable as a work array, when said conditional induction variable reference state analysis means determines that the conditional induction variable is referenced externally of the conditional structure;

substitution means, sequential to the conditional induction variable iteration generating means, for substituting the conditional induction variable iteration generated by the conditional induction variable iteration generating means for the conditional induction variable in the input program; and vectorizable object program generator means, sequential to the substitution means, for converting the input program from the substitution means into the object program having a vector processing instruction.

2. A vectorization system in a pre-processor of a computer having a vectorizing function for performing a vectorization of an input program into an object program having a vector processing instruction in order to make efficient use of the vectorizing function, said vectorization system comprising:

conditional induction variable detecting means, responsive to the input program, for detecting a conditional induction variable defined within a conditional structure containing a set of statements executed with conditions in loop parts of the input program;

conditional induction variable reference state analysis means for determining whether the conditional induction variable is referenced externally of the conditional structure in which the conditional induction variable is defined, when the conditional induction variable defined in the conditional structure is detected by said conditional induction variable detecting means;

conditional induction variable iteration generating means for generating a conditional induction variable iteration representing the conditional induction variable as a work array, when said conditional induction variable reference state analysis means determines that the conditional induction variable is referenced externally of the conditional structure;

substitution means, sequential to the conditional induction variable iteration generation means, for substituting the conditional induction variable iteration generated by the conditional induction variable iteration generating means for the conditional induction variable in the input program; and vectorizable object program generator means, sequential to the substitution means, for converting the input program from the substitution means into the object program having a vector processing instruction.

3. A vectorization system in a language processing system for a computer having a vectorizing function for performing a vectorization of an input program into an object program having a vector processing instruction in order to make efficient use of the vectorizing function, said vectorization system comprising:

conditional induction variable detecting means, responsive to the input program, for detecting a conditional induction variable defined within a conditional structure containing a set of statements executed with conditions in loop parts of the input program;

conditional induction variable reference state analysis means for determining whether the conditional induction variable is referenced outside of the condition structure in which the conditional induction variable is defined, when the conditional induction variable defined in the conditional structure is detected by said conditional induction variable detecting means;

conditional induction variable iteration generating means for generating a conditional induction variable iteration representing the conditional induction variable as a work array, when said condition induction variable reference state analysis means determines that the conditional induction variable is referenced externally of the conditional structure;

substitution means, sequential to the conditional induction variable iteration generating means, for substituting the conditional induction variable iteration generated by the conditional induction variable iteration generating means for the conditional induction variable in the input program; and vectorizable object program generator means, sequential to the substitution means, for converting the input program from the substitution means into the object program having a vector processing instruction.

4. A vectorizing method to be used in a compiler of a computer having a vectorizing function for performing a vectorization of an input program into an object program having a vector processing instruction in order to make an effective use of the vectorizing function, comprising the steps of:

detecting a conditional induction variable defined within a conditional structure containing a set of statements executed with conditions in loop parts of the input program;

determining whether the conditional induction variable is referenced externally of the conditional structure in which the conditional induction variable is defined, when the conditional induction variable defined in the conditional structure is detected in said conditional induction variable detecting step;

generating a conditional induction variable iteration representing the conditional induction variable as a work array, when said conditional induction variable reference state analyzing step determines that the conditional induction variable is referenced externally of the conditional structure; then substituting the conditional induction variable iteration for the conditional induction variable in the input program; and then converting the input program into the object program having a vector processing instruction.

5. A vectorizing method to be used in a preprocessor for a computer having a vectorizing function for performing a vectorization of an input program into an object program having a vector processing instruction in order to make an effective use of the vectorizing function, comprising the steps of:

detecting a conditional induction variable defined within a conditional structure containing a set of statements executed with conditions in loop parts of the input program;

determining whether the conditional induction variable is referenced externally of the conditional structure in which the conditional induction variable is defined, when the conditional induction variable defined in the conditional structure is detected in said conditional induction variable detecting step;

generating a conditional induction variable iteration representing the conditional induction variable as a work array, when the conditional induction variable is referenced externally of the conditional structure; then substituting the conditional induction variable iteration for the conditional induction variable in the input program; and then converting the input program into the object program having a vector processing instruction.

6. A vectorizing method to be used in a language processing system for a computer having a vectorizing function for performing a vectorization of an input program into an object program having a vector processing instruction in order to make an effective use of the vectorizing function, comprising the steps of:

detecting a conditional induction variable defined within a conditional structure containing a set of statements executed with conditions in loop parts of the input program;

determining whether the conditional induction variable is referenced outside of the conditional structure in which the conditional induction variable is defined, when the conditional induction variable defined in the conditional structure is detected in said conditional induction variable detecting step;

generating a conditional induction variable iteration representing the conditional induction variable as a work array, when the conditional induction variable is referenced externally of the conditional structure; then substituting the conditional induction variable iteration for the conditional induction variable in the input program; and then converting the input program into the object program having a vector processing instruction.

* * * * *